Figure 1:
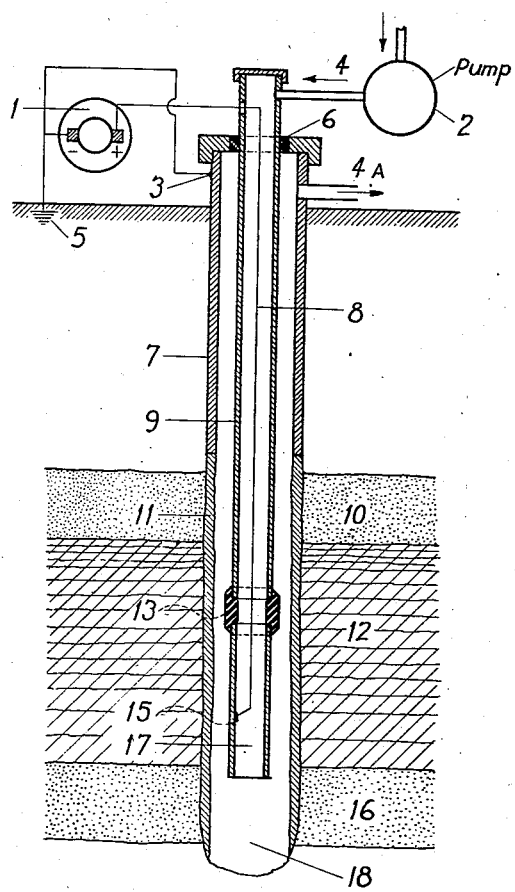

Oct. 15, 1940.　　　H. T. BYCK　　　2,217,857

PROCESS FOR THE REMOVAL OF MUD SHEATHS

Filed April 17, 1937

Inventor: Harold T. Byck
By His Attorney:

Patented Oct. 15, 1940

2,217,857

UNITED STATES PATENT OFFICE 2,217,857

PROCESS FOR THE REMOVAL OF MUD SHEATHS

Harold T. Byck, Berkeley, Calif., assignor to Shell Development Company, San Francisco, Calif., a corporation of Delaware Application April 17, 1937, Serial No. 137,518

10 Claims. (Cl. 166—21)

This invention pertains to methods of treating oil and gas wells for the purpose of increasing their production, and relates more particularly to an electrical method of removing mud sheaths from the walls of boreholes.

In drilling wells by the rotary method, relatively impervious mud sheaths are formed on the walls of the borehole by the mud fluid circulated during the drilling. The formation of such mud sheaths is sometimes desirable, especially in wells passing through porous or unstable formations, since the mud sheath helps to retain the fluid in the borehole, prevents circulation losses, and decreases the danger of cave-ins. In such cases, the drilling fluid, which is generally a colloidal clay suspension, is often conditioned so as to insure the formation of a particularly strong and impervious mud sheath.

In many cases, however, the presence of mud sheaths in wells is not desirable. For example, mud sheaths deposited against the faces of producing sands prevent the inflow of oil and gas into the well, and operators are confronted in such cases with the problem of their removal.

It is known that, whereas mud sheaths are formed under considerable pressures, a reverse pressure of from 5 to 25 pounds is usually sufficient to detach them from the walls of the well. While this somewhat simplifies the problem of their removal in high pressure wells, the formation pressure in a great majority of wells, and particularly in old and semi-depleted wells is much too low to be effective in removing mud sheaths.

Various mechanical means, such as reamers, perforation washers, down swabs and agitators have been used for disintegrating mud sheaths and removing the broken up materials from the wells.

Chemical methods have likewise been applied for the same purpose. For example, it has been proposed to add calcium carbonate, such as pulverized limestone, to the mud fluids used in drilling, so that the resultant mud sheath would be susceptible to disintegration by subsequent treatment with acid solutions.

Such methods, however, are relatively slow, costly and subject to many other drawbacks, especially in cases where the sheath is located behind a perforated casing or liner which it is not desired to remove.

It is the object of the present invention to provide a method for quickly and inexpensively removing mud sheaths from either uncased wells or wells provided with perforated casing or lining, without previously treating the mud fluid with a view to the subsequent removal of the mud sheath by chemical means.

It is also the object of the present invention to provide a method for the selective removal of mud sheath from such sections of the borehole as may be desired, without affecting the protective sheath in such other sections where its presence may be beneficial.

The method of the present invention is based on the phenomenon known as cataphoresis, due to the property of charged colloidal particles to move under the influence of an electric field. Colloidal particles generally carry an electric charge, and will, under the influence of a potential difference, move toward an electrode having a charge opposite to their own. This property of colloidal suspensions has found many applications in industry, for example, in the anodic processes for the electrical deposition of rubber. Clay particles are known to be negatively charged, so that they will, in suspension, move toward a positive electrode, where, giving up their charges, they will plate onto said electrode. Such migration is known as electroendosmosis.

It may be noted that it has already been proposed to use electrical methods for the treatment of wells. Such a method, for example, is described in the U. S. Patent 1,784,214 to Workman. The object of the latter patent is, however, not to remove mud sheaths from wells, but to produce by electrolysis of the water a gaseous reagent effective in increasing the productivity of the well. This object is achieved by Workman by virtue of the conductivity of the water due either to natural salinity or to deliberate addition of electrolytes to the water.

The object of the present method is the cataphoresis of the clay particles, and the effectiveness of this process would actually be decreased by the electrolysis resulting from high conductivity water. It is therefore required, for the purposes of the present method, that the conductivity of water be as low as possible, a condition which may necessitate flowing pure water through the bore to prevent contamination by saline connate waters during the treatment, or the shut-off of water-producing horizons previous to treatment, or both.

Because of these requirements, the electrical conditions under which the two methods are applied are entirely different. While in Workman's process a low potential is sufficient to pass a heavy current through the system, the present process requires a high voltage to produce a relatively very small current flow, as will be fully explained below.

Figure 2:
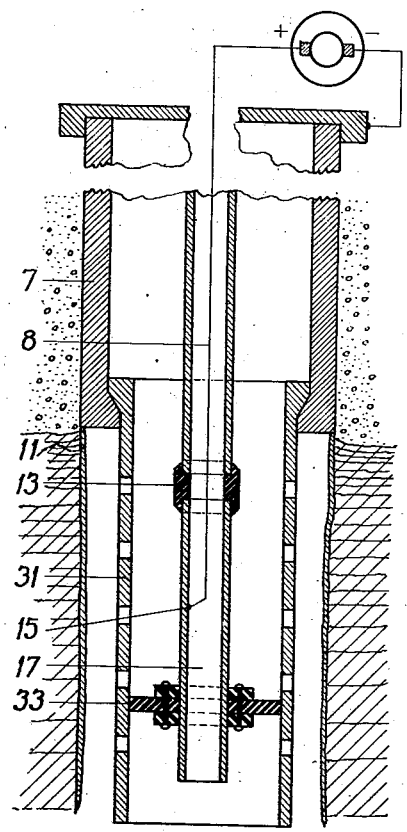
Figure 3:
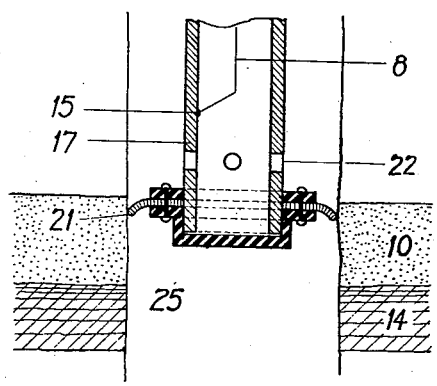

The manner in which the process of the present invention may be applied for the removal of mud sheaths from wells will be described with reference to the appended drawings, wherein Fig. 1 diagrammatically illustrates the application of the process to an uncased portion of a well, Fig. 2 illustrates the application of the process to a well provided with a perforated liner, and Fig. 3 illustrates the application of the process to wells passing through water-bearing formations.

Referring to Fig. 1, a well 18 is shown provided in its upper portion with a casing 7. A mud sheath 11 has been formed on the walls of the well during drilling. To disintegrate and to remove this sheath from the well an electrode such, for example, as a string of tubing or drilling pipe sections 9 is lowered into the fluid filling the well and connected at 15 to the positive terminal of a generator 1 or any other source of electric power. The negative terminal of the generator is grounded at 5 to maintain the formation and the mud sheath at a negative potential. If the resistance of the formations intervening between the surface and the level at which the mud sheath is to be removed is relatively high, it may be preferable to connect the negative terminal to the casing as shown at 3 in order to maintain the mud sheath at a negative potential by making use of the good conductivity of the casing.

If the mud sheath is to be removed from the well over its total uncased portion or a substantial portion thereof, the positive terminal may be connected to the tubing or pipe string serving as anode at any desired place, the tubing string being in such cases suitably insulated from the casing and other ground connections, as shown at 6. However, if the mud sheath is to be removed only at a desired level, for example, from the face of an oil-bearing layer 12 lying between two porous layers 10 and 16, a suitable insulating joint 13 may be inserted into the tubing string to insulate electrically a tubing section 17 from the rest of the string. The positive terminal is then connected to said section 17, for example, by welding thereto the end of an insulated cable 8. The length of the section 17 may be of any desired length, but is preferably selected so as not to exceed the length of that portion of the well between formations 10 and 16 from which the mud sheath is to be removed. If the thickness of the formation to be treated is greater than the length of the electrode 17, the string 9 can be gradually raised or lowered during the process, the electrode 17 being thereby moved vertically through any desired portion of the well. It is clear that the anode can also be constructed in any other desired manner; for example, it may consist of a metallic body of any suitable shape connected to the positive terminal of a source of electric power and lowered into the well by means of an insulated cable.

When a positive potential is impressed on the electrode 17, the negatively charged clay particles forming the mud sheath tend to move towards the anode according to the cataphoresis effect. Only a few of the smallest particles, however, reach the anode and plate themselves thereon, while the greater portion of particles become detached from each other and slide down to the bottom of the well by gravity. The general structure of mud sheath becomes weakened and disintegrated by the motion of the clay particles in a relatively very short time, and crumbles to the bottom of the well, wherefrom it can be subsequently removed by bailing.

It must be particularly pointed out here that removal of mud sheaths is effected according to the present invention by the cataphoretic effect due to the potential impressed on an anode lowered into the well, and not by the electrolytic effect due to the current passing through the well fluid. The current passing between the mud sheath and the anode under conditions of the present invention is substantially the current due to the charges carried by the clay particles, and not an electrolytic current due to the conductivity of the well fluid. Such electrolytic current would affect unfavorably the cataphoresis of clay particles and decrease the efficiency of the present process. The latter is, therefore, carried out under such conditions that a relatively high potential of approximately from 50 to 500 volts, for example, 150 volts, may be applied to the anode, while the current is kept at a low value, preferably not exceeding a few milliamperes per square inch of the anode, by the use of a substantially non-electrolytic liquid between the anode and the sheath.

Since the aqueous fluid filling a well is usually of a considerable degree of salinity and would allow exceedingly large electrolytic currents to pass therethrough, any well from which the mud sheath is to be removed by the present process must be subjected to a special treatment, unless the fluid filling it is found to be naturally free of electrolytes.

For example, fresh water may be forced down the tubing by means of a pump 2 and a conduit 4 and withdrawn from the casing through conduit 4A. This circulation is continued until the salinity of the water issuing through conduit 4A is found by tests to be sufficiently low to prevent any appreciable electrolytic conduction. It has been found that for efficient operation the aqueous liquid must preferably have a resistance of from $1.55 \times 10^5$ to $1.17 \times 10^3$ ohms/cu. centimeter under the conditions of cataphoresis. The water level in the well is adjusted so as to cover the formation to be treated, and the rest of the borehole is filled with oil or some other insulating fluid. If the negative terminal of the generator 1 is connected at 3 to the casing, it is desirable that the lower end of the casing be covered by said column of oil in order that the current flow from the formation to the anode, rather than from the end of the casing to the anode. The positive potential may then be applied to the electrode, and the removal of the mud sheath effected as described, the circulation being meanwhile continued if desired.

If the well passes through a water-bearing formation, such as shown at 14 in Fig. 3, which causes an inflow of saline water into the well, such formations must be carefully shut off, for example, by means of plugs or packers. An expansible packer 21 made of rubber or canvas may be suitably attached to the electrode pipe 17 so as to prevent any inflow of saline water from the water-bearing layer 14 to the space above the packer. The electrode pipe 17 is closed at the bottom by a plug 25, and is provided above the packer with holes 22, to provide for the necessary fresh water circulation.

The procedure described above may be followed also in the case of wells provided with perforated casing, screens or lines. Fig. 2 shows a perforated liner 31 attached to the end of a cemented casing 7. If the mud sheath 11 has not been removed prior to the insertion of the liner, its removal from behind the liner can be conveniently effected by lowering a positive electrode 17 within the liner and carrying out the process described above. It has been found that although the liner 31 may be connected to the casing 7 and is therefore at a negative potential, or at least at the same potential as the formation, this does not affect adversely the process. The mud sheath disintegrates rapidly and falls to the bottom of the well between the perforated liner and the walls of the borehole, only a few of the small clay particles passing to the anode through the perforations of the liner.

The anode may be provided with suitable insulating spacers such as shown at 33, to prevent it from coming in contact with the liner. Such spacers can also be used when operating in uncased holes, and especially in crooked holes, to prevent contact between the anode and the mud sheath.

It may be additionally pointed out that in using the method of the present invention (either in holes provided with liners or not), it may sometimes be advisable, after the mud sheath has been substantially removed, and either before or after it has been flushed out of the well, to reverse for a short time the direction of the current flow by changing the polarity of the generator, as such reversal may be effective in starting production by causing a movement of liquids through the porous formation towards the well face.

I claim:

1. In the process of removing a mud sheath from a well, the steps of maintaining a substantially electrolytically non-conductive fluid in the well, immersing therein an electrode insulated from the ground, and maintaining said electrode at a sufficiently high positive potential with regard to the mud sheath to produce a cataphoretic effect on clay particles of the sheath, whereby said sheath is disintegrated.

2. In the process of removing a mud sheath from a well, the steps of maintaining a substantially electrolytically non-conductive fluid in the well, immersing therein an electrode insulated from the ground, connecting said electrode to the positive terminal of a source of electric power, grounding the negative terminal of said source of electric power, and maintaining said electrode at a sufficiently high positive potential with regard to the mud sheath to produce a cataphoretic effect on clay particles of the sheath, whereby said sheath is disintegrated.

3. In the process of removing a mud sheath from a well, the steps of maintaining a substantially electrolytically non-conductive fluid in the well, immersing therein an electrode insulated from the ground, connecting the positive terminal of a source of electric power to said electrode, connecting the negative terminal to the casing, and maintaining said electrode at a sufficiently high positive potential with regard to the mud sheath to cause a cataphoretic effect on clay particles of the sheath whereby said sheath is disintegrated.

4. In the process of removing a mud sheath from a well, the steps of circulating fresh water through the well until the fluid filling the well is substantially electrolytically non-conductive, immersing into said fluid an electrode insulated from the ground, and maintaining said electrode at a sufficiently high positive potential with regard to the mud sheath to cause a cataphoretic effect on clay particles of the sheath, whereby said sheath is disintegrated.

5. In the process of removing a mud sheath from a well, the steps of circulating fresh water through the well until the specific resistivity of the fluid filling the well is above 1200 ohms, immersing in said fluid an electrode insulated from the ground, and maintaining said electrode at a sufficiently high positive potential with regard to the mud sheath to cause a cataphoretic effect on clay particles of the sheath, whereby said sheath is disintegrated.

6. In the process of removing a mud sheath from a well passing through a saline water bearing formation, the steps of shutting off such formation by means of packers or plugs, circulating fresh water through the well until the fluid filling the well is substantially electrolytically non-conductive in immersing in said fluid an electrode insulated from the ground, and maintaining said electrode at a sufficiently high positive potential with regard to the mud sheath to cause a cataphoretic effect on clay particles of the sheath, whereby said sheath is disintegrated.

7. In the process of removing a mud sheath from a portion of a well, the steps of circulating fresh water through the well until the fluid filling the well is substantially electrolytically non-conductive, allowing said fluid to fill that portion of the well from which the mud sheath is to be removed, filling the remaining portion of the well extending to the surface with oil, immersing into said fluid an electrode insulated from the ground, and maintaining said electrode at a sufficiently high positive potential to cause a cataphoretic effect on clay particles of the sheath, whereby said sheath is disintegrated.

8. In the process of removing a mud sheath from a well provided with a perforated casing or liner, the steps of maintaining an electrolytically non-conductive fluid in the well, immersing in said liquid within the perforated casing an electrode insulated from the ground and from said casing, and maintaining said electrode at a sufficiently high positive potential to cause a cataphoretic effect on clay particles of the mud sheath behind the perforated casing, whereby said sheath is disintegrated.

9. In the process of removing a mud sheath from a vertical portion of the walls of the well, the steps of maintaining an electrolytically non-conductive fluid in the well, immersing therein an electrode insulated from the ground, and alternately raising and lowering said electrode within that vertical portion of the well from which the sheath is to be removed, while maintaining said electrode at a sufficiently high positive potential with regard to the mud sheath to produce a cataphoretic effect on the clay particles of the sheath, whereby said sheath is disintegrated.

10. In a method of removing the mud lining from the walls of a well bore, the steps which comprise introducing into the well bore a liquid which will undergo electroendosmosis without substantial electrolysis when subjected to relatively high electric potential, and applying a potential sufficient to cause an electric current to pass between an electrode immersed in the solution in the well and a ground connection whereby the liquid in the well bore is caused to migrate into the mud lining.

HAROLD T. BYCK.